April 15, 1941.   H. A. HADLEY   2,238,363
ELECTRICAL IMPULSE WEIGHT RECORDER
Filed Oct. 29, 1936   8 Sheets-Sheet 1
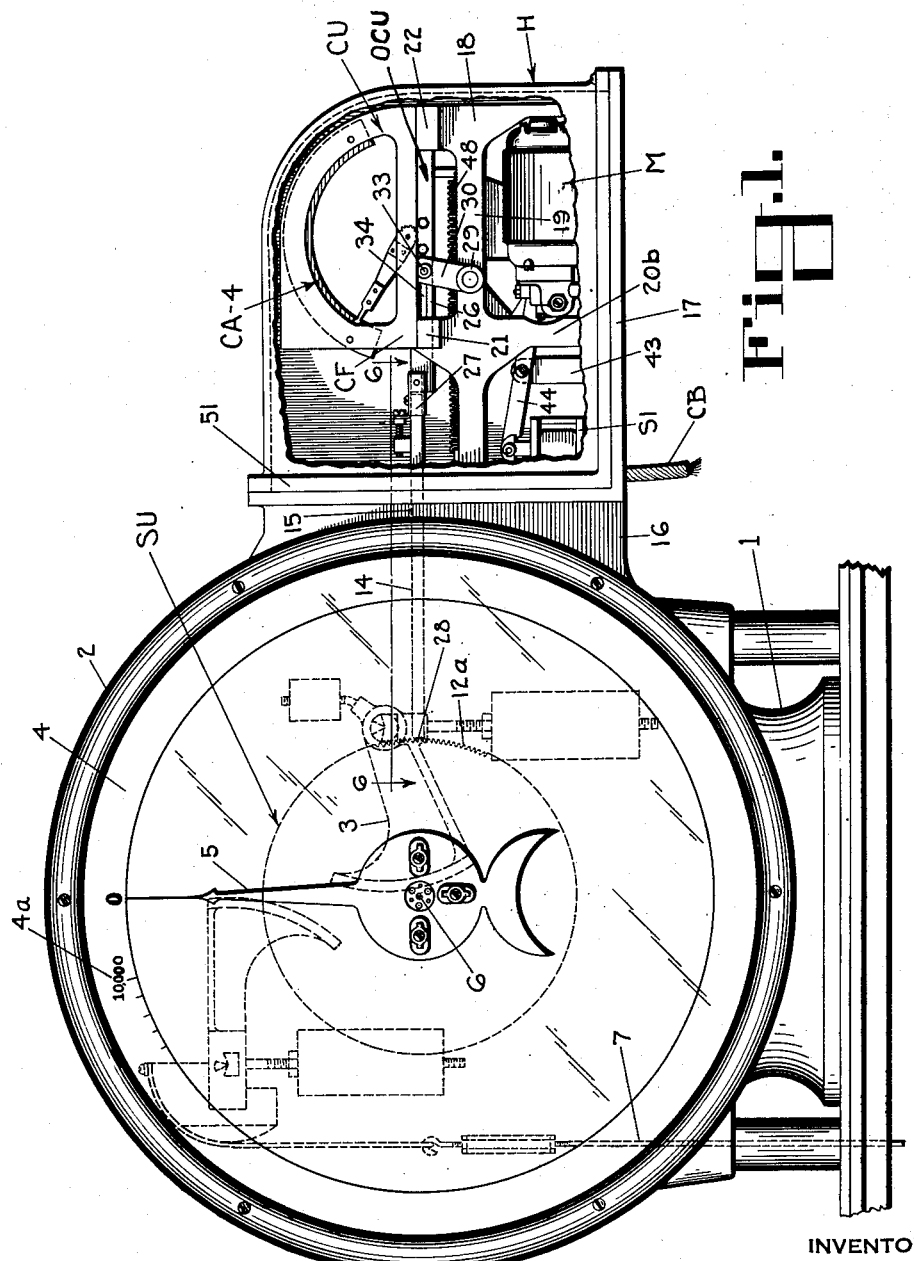
INVENTOR
HARLAN A. HADLEY
BY
ATTORNEY April 15, 1941. H. A. HADLEY 2,238,363
ELECTRICAL IMPULSE WEIGHT RECORDER
Filed Oct. 29, 1936   8 Sheets-Sheet 2
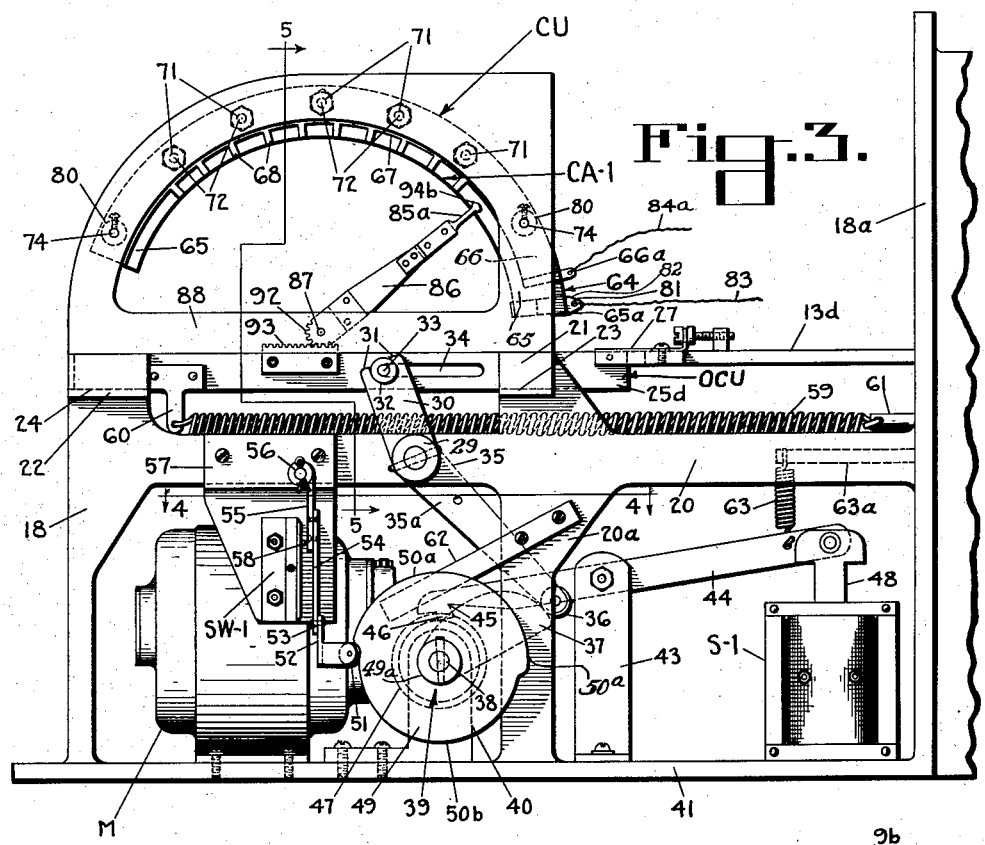
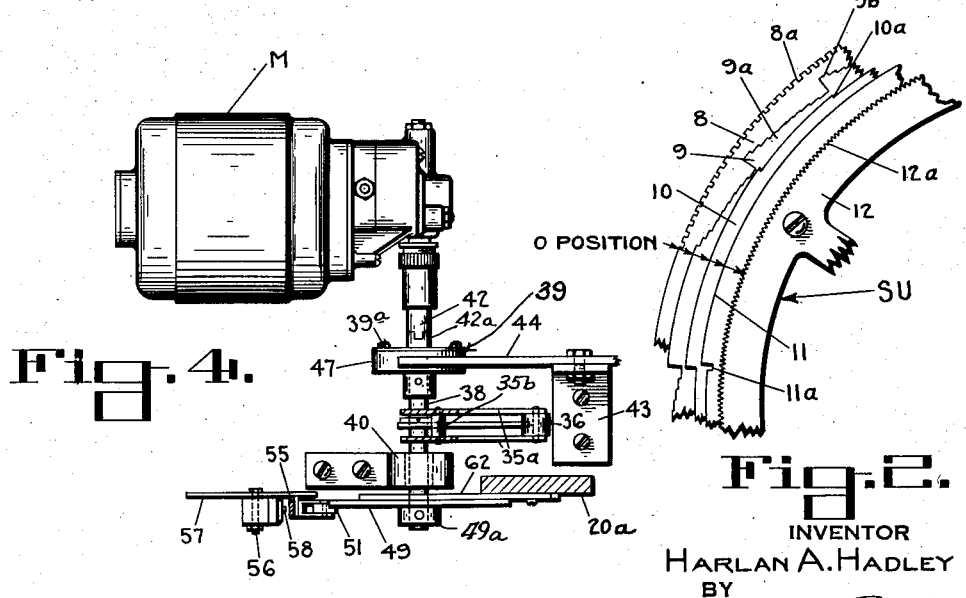
INVENTOR
HARLAN A. HADLEY
BY
ATTORNEY

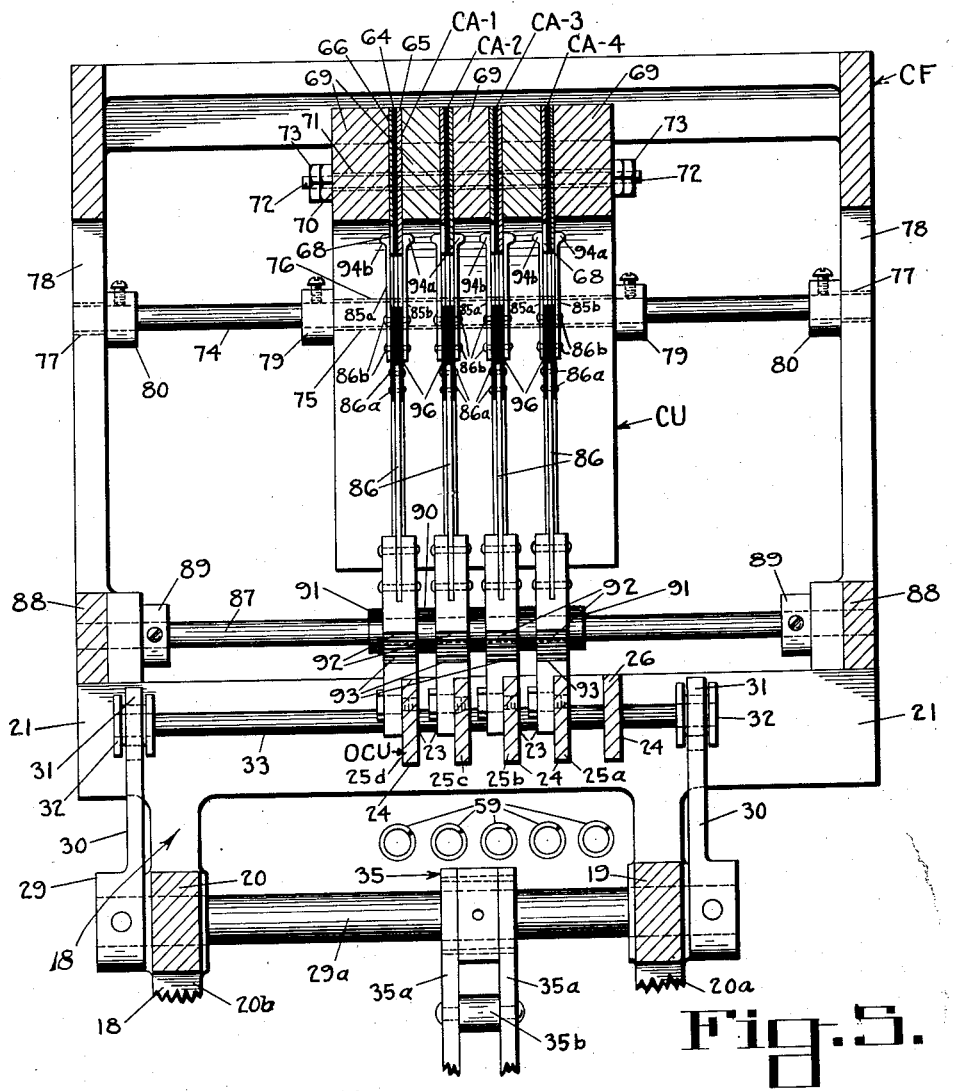

April 15, 1941.  H. A. HADLEY  2,238,363
ELECTRICAL IMPULSE WEIGHT RECORDER
Filed Oct. 29, 1936  8 Sheets-Sheet 4
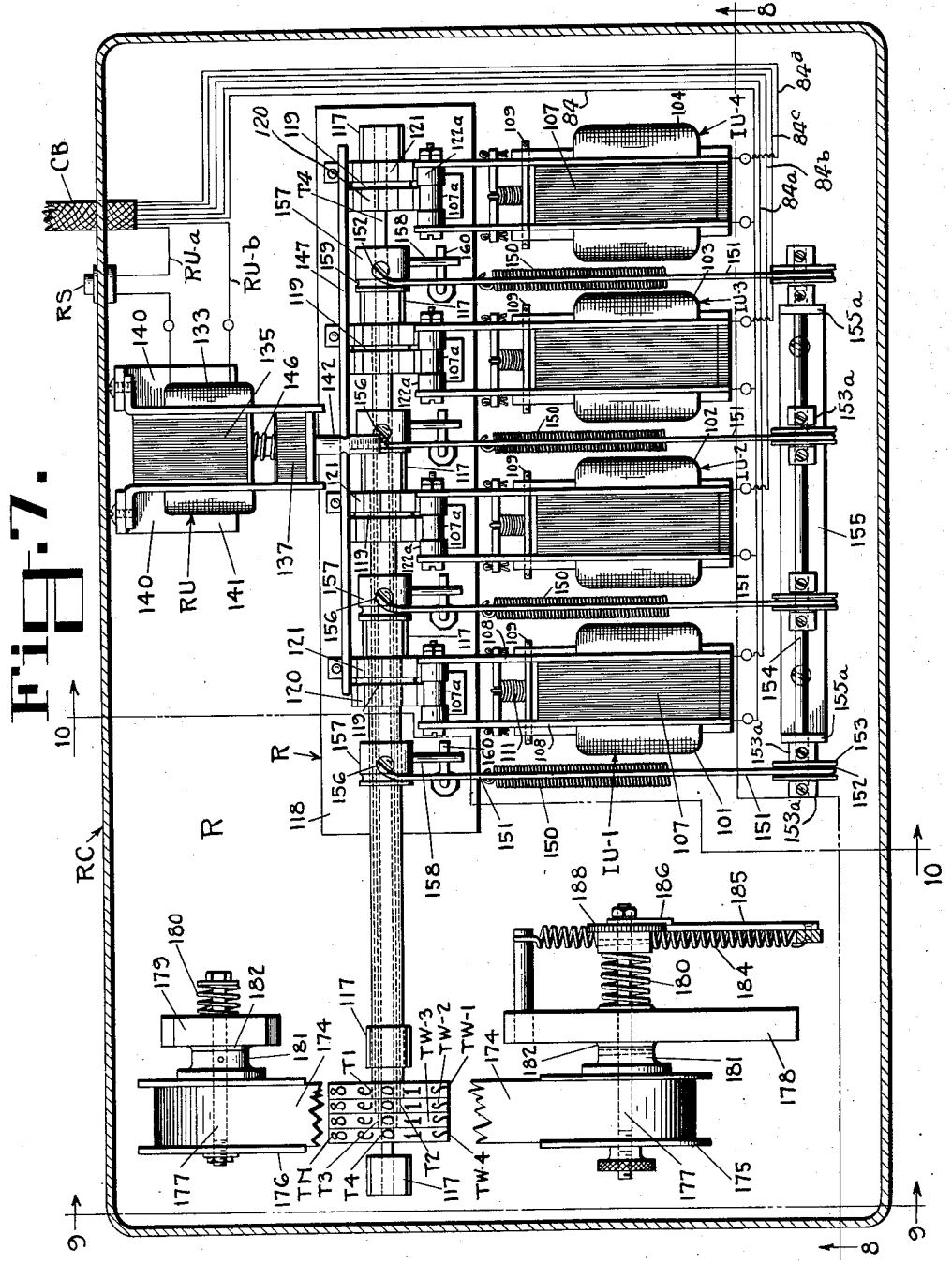
INVENTOR
HARLAN A. HADLEY
BY
ATTORNEY

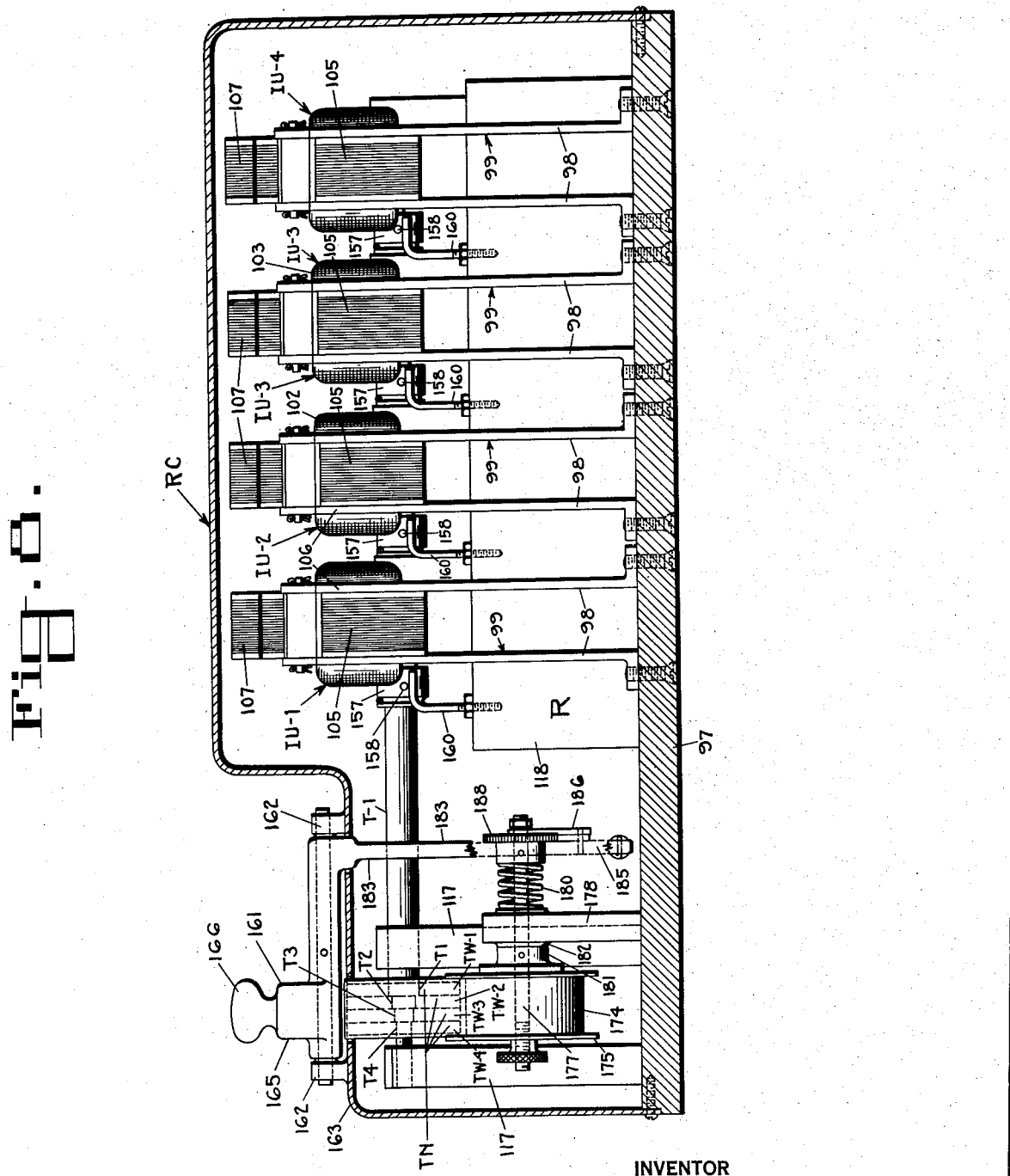

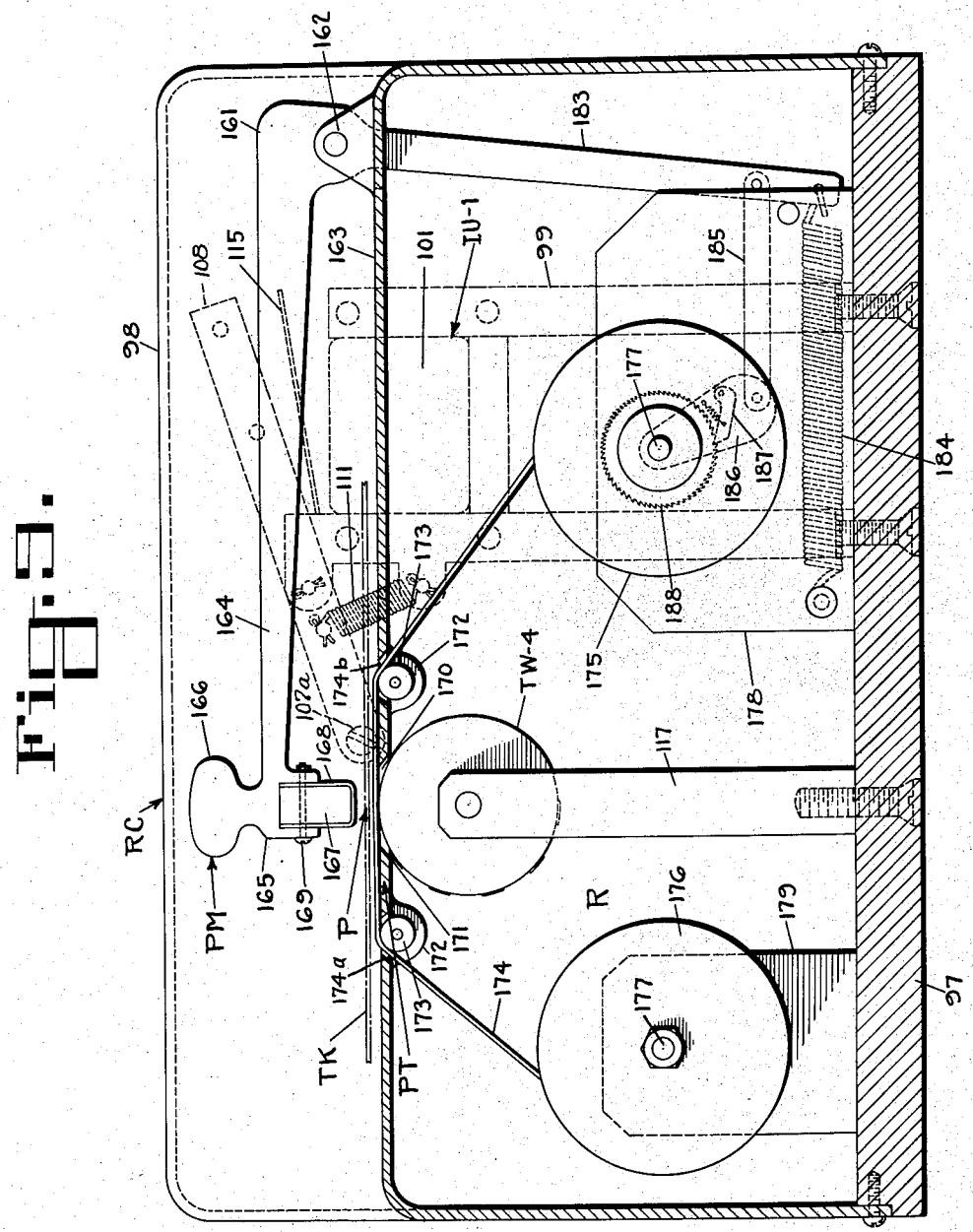

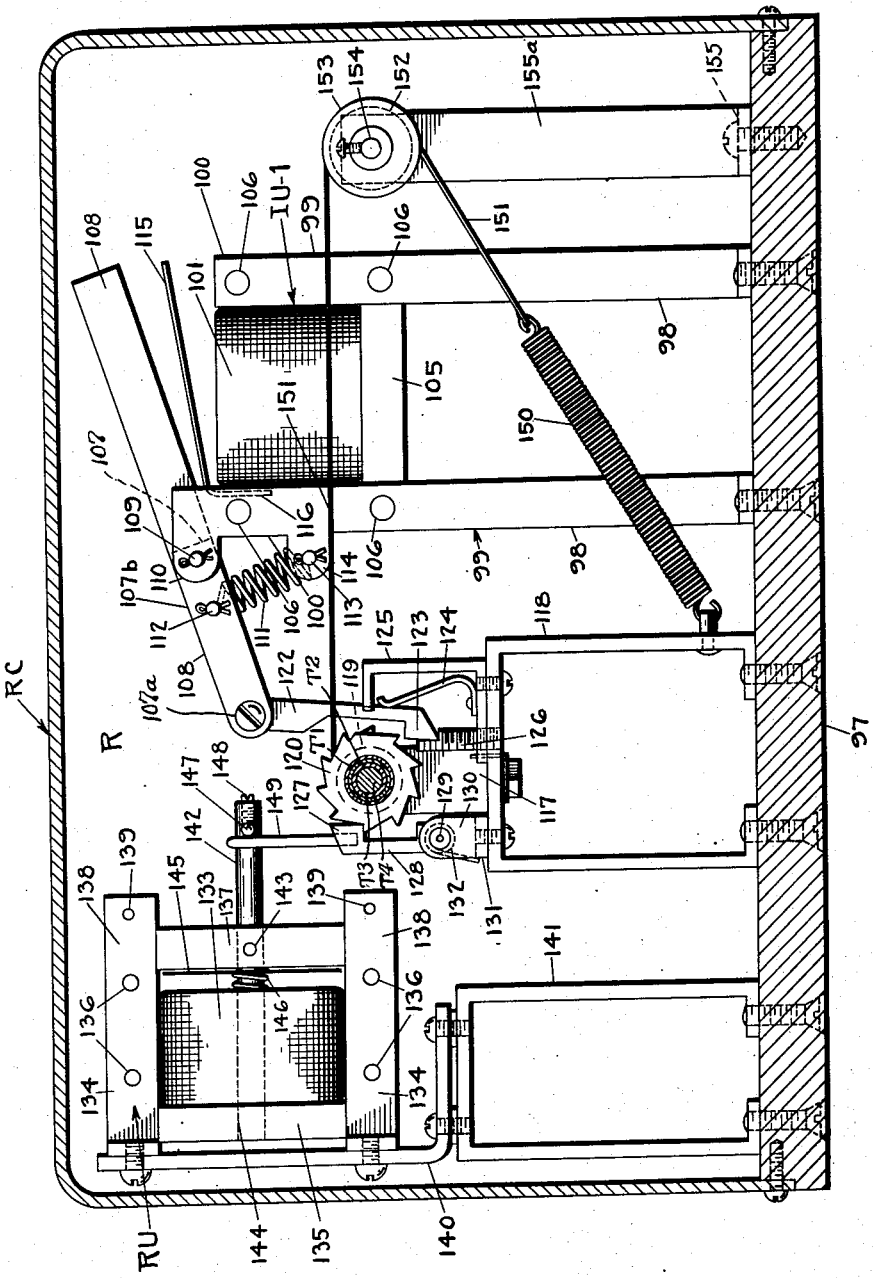

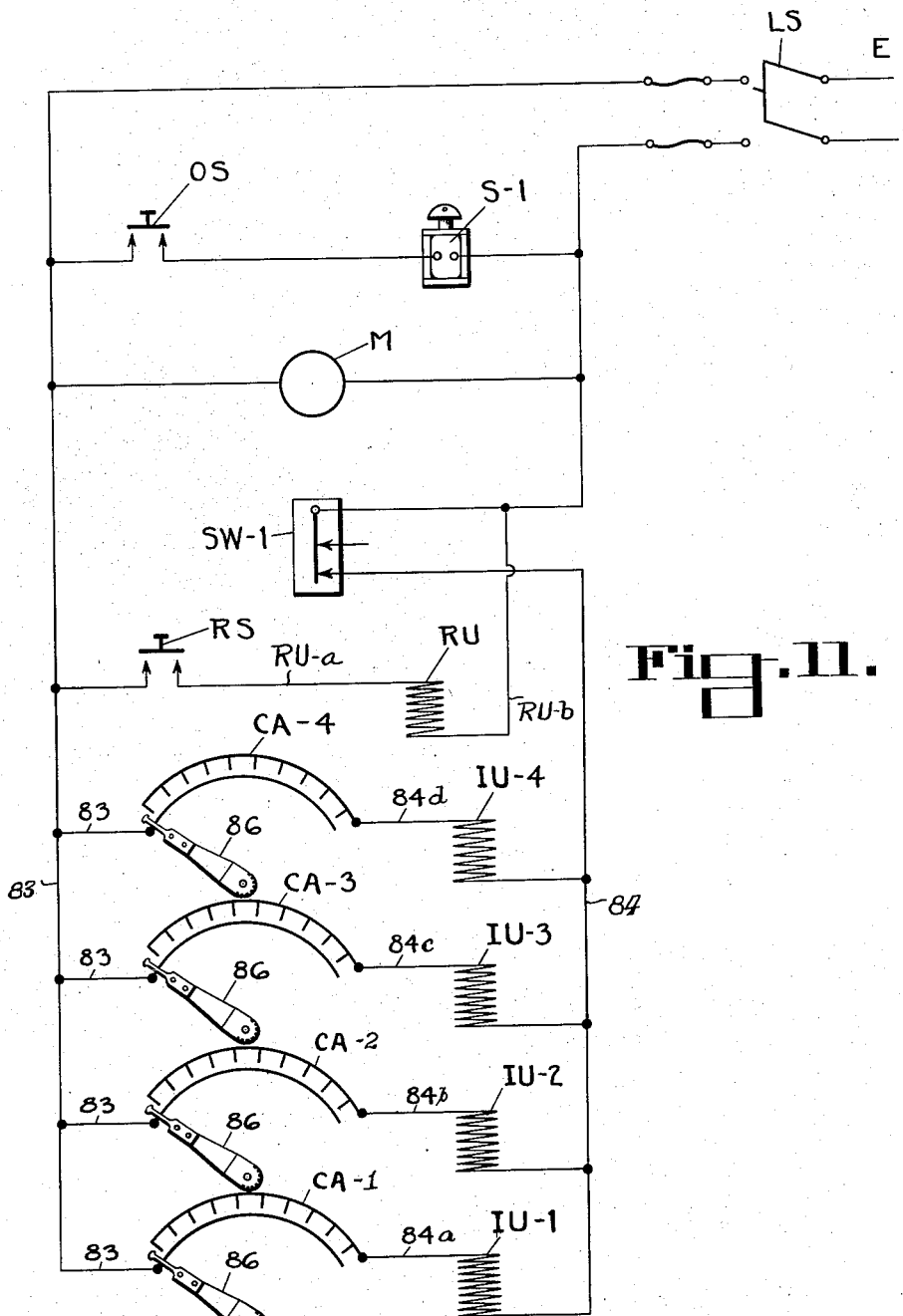

Patented Apr. 15, 1941

2,238,363

UNITED STATES PATENT OFFICE 2,238,363

ELECTRICAL IMPULSE WEIGHT RECORDER

Harlan A. Hadley, St. Johnsbury, Vt., assignor, by mesne assignments, to Fairbanks, Morse & Company, Chicago, Ill., a corporation of Illinois Application October 29, 1936, Serial No. 108,231

5 Claims. (Cl. 177—380)

This invention relates to electrical recorders and has reference especially to recorders to be used with scales and employing co-operating control mechanism for setting up and transmitting numerical values by means of electrical impulses which are adapted to operate a remotely located electrically controlled recorder.

An important object of the invention is to provide an operating control unit actuated by an applied force, such as the load on the scale, and adapted to set up the digits of the numerical value on an electrical commutator or contactor transmitting unit.

Another important object is to provide the electrical contactor transmitting means with associated mechanism adapted to successively produce electrical impulses controlling the set-up of the selected digits of numerical values of a series of numerical orders in a remotely located recording mechanism.

Another important object is to provide a simplified electric circuit between the contactor transmitting unit and the recorder, whereby the number of wires employed is greatly reduced over former constructions and thus the expense of installation and servicing is materially reduced and greater efficiency effected.

Another object is to provide the recording mechanism with an individual electric control for the digits of each numerical order denoting numerical values comprising an electromagnet under control of impulses transmitted by its associated digit registered in the electrical contactor transmitting unit, whereby the particular digit transmitted is set up on the co-operating type wheel of the recording mechanism, while the group of type wheels thus set up designates the total numerical value.

Another object is to provide a series of electro-magnetic impulse receiving units adapted to operate a co-operating series of rotatable interfitting recorder units for recording numerical values transmitted to the co-operating impulse receiving units.

Another object is to provide electrically operated universal resetting control mechanism for universally resetting the entire series of rotatable recorder units and return them simultaneously to their zero or initial positions.

In order that the nature of my invention may be fully understood, I have illustrated certain embodiments of the invention as employed in connection with weighing scales, in which:

Figure 1 is a vertical front elevation of the dial housing showing the operating control unit and contactor transmitting unit which are mounted on the dial housing, with the housing broken away in order to show the operative parts within.

Figure 2 is an enlarged fragmentary view of a section of the weight selector discs and the locating disc of the weight selector assembly unit.

Figure 3 is an enlarged vertical, side elevation of the operating control unit and commutator transmitting unit with the housing removed.

Figure 4 is a cross section on the line 4—4 of Figure 3, showing the electrical motor for operating the various mechanisms including the clutch and unlocking mechanism for the contactor fingers and associated mechanism.

Figure 5 is a cross section on the line 5—5 of Figure 3, showing the operating control unit and the group of contactors and contactor fingers controlled thereby for closing the several circuits and thereby transmitting the respective digits of the numerical value denoting weight value to the recorder.

Figure 6 is a top plan view, on the line 6—6 of Figure 1, showing the relative co-operative relation of the weight selector discs, selector fingers and control slides of the operating control unit.

Figure 7 is a top plan view, partly in section, showing the remotely located recording and printing units, including the telescopic tubes which carry the type wheels, also the printing ribbon.

Figure 8 is a longitudinal section on the line 8—8 of Figure 7, showing the printing ribbon and its mounting together with the printing hammer.

Figure 9 is a cross section on the line 9—9 of Figure 7, including the printing hammer and platen of the recording mechanism.

Figure 10 is a cross section on the line 10—10 of Figure 7 showing one of the electrical impulse magnet coils, ratchet mechanism for operating the type wheels, together with the universal resetting control mechanism, and cooperating mechanism.

Figure 11 is a diagrammatic view showing the electric circuit together with the various magnets and solenoids operated thereby.

Referring to the drawings 1 designates a dial head of a dial scale of a well-known type as employed with the recorder, having a housing 2, in which are located the weight indicating mechanism 3 provided with a dial 4 and indicator 5 mounted on an indicator shaft 6, having the beam rod 7 operatively connected to the beam, which is not shown. Upon the inner end of the indicator shaft 6 is fixedly attached a weight value selector unit SU (Figs. 1 and 2), which is shown and fully described in Patent No. 2,070,011, Recording scale, Harlan A. Hadley and Guldbrand Guldbrandsen, February 9, 1937. This unit SU comprises a series of spaced skeleton weight selector discs 8, 9, 10 and 11 together with a locating disc or star wheel 12 (Fig. 2), all of which discs are assembled together in an integral weight value selector unit SU adapted to revolve with the indicator shaft 6, the peripheral edges of which are provided with a series of weight value designating notches. Therefore, in the dial scale illustrated the maximum dial capacity is 10,000 pounds, the dial 4 of which is provided with dial graduations 4a representing weight values in multiples of 50 pounds, the tens disc 8 being provided on its edge with 200 notches 8a, each notch denoting a weight value of 50 pounds, and the hundreds disc 9 is provided with 10 notches 9a, each notch denoting a weight value of 100 pounds each. The thousands disc 10 is provided with 9 notches 10a of a weight value of 1,000 pounds each, while the ten thousands disc 11 is provided with one notch 11a representing the total dial capacity of 10,000 pounds. The locating disc or star wheel 12 is provided with 200 notches 12a, one notch for each graduation of the dial and adapted to position the weight selector discs at the nearest point where the indicator 5 comes to rest on the dial, so as to enable the weight selector discs to register the total weight value of the load as indicated. It is to be noted that the hundreds disc 9 and thousands disc 10 are provided with nine notches 9a and 10a respectively, because the total weight value of the disc is taken up and registered by the succeeding disc. Further, the number of discs may be varied to conform to particular dial capacity requirements, as may be the dial graduations.

*Weight value selecting mechanism and operating control unit*

The weight value of the load on the scale, as set up by the rotated weight selector discs 8, 9, 10, 11 and 12, is transmitted by weight value selector fingers 13a, 13b, 13c and 13d respectively (Figs. 1, 3 and 6), as described in the above patent application, which engage and co-operate with the weight selector discs 8—11, while a special selector finger 14 is provided for the locating disc or star wheel, which is thus held together with the other discs locked in the position set up by the weighing mechanism. The selector fingers are in the form of rectangular bars, which extend through an opening 15 in a boss 16 located at the side of the dial head 1, to which is attached an L-shaped bracket 17 having mounted thereon a main assembly frame 18 provided with spaced longitudinal side bars 19 and 20, surmounting spaced upright supports 20a and 20b, and spaced cross bars 21 and 22, the whole structure forming an assembling unit for the weight value transmitting or commutator unit CU, enclosed in a housing H. In the cross bars 21 and 22 there are slidably mounted in transverse spaced slots 23 and 24 respectively, a series of control slides 25a, 25b, 25c and 25d forming in their entirety an operating control unit OCU adapted to control the setting up of numerical values, in this case denoting the total weight value of the load, as hereinafter described together with a locating control slide 26 adapted by means of the engagement of its co-operating selector finger 14 with the locating disc 12 in locking the weight value selector unit in a fixed position as previously described. These various control slides co-operate with resilient means (Fig. 3), which means is adapted to control the movement of the selector fingers 13a, 13b, 13c and 13d and 14 to the discs 8, 9, 10, 11 and 12 respectively and their engagement with the discs in selecting the numerical or weight values set up by the discs, which control unit slides of the operating control unit OCU are shown in Figs. 3, 5 and 6 in their retracted or inoperative position. The operating control slides 25a—25d and 26 are connected to the weight selector fingers 13a—13d and locating selector finger 14 by means of adjustable connectors 27, which serve to permit accurate adjustment of the position of the notched inner ends 28 of the selector fingers (Figs. 1 and 6) with relation to the notches and steps of the discs.

In order to advance and retract the various selector fingers so as to co-operate with the weight selector discs in setting up the weight value of the load, a U-shaped selector slide control bracket 29 (Figs. 3 and 5) is provided, which is pivotally mounted on a rod 29a seated in the longitudinal side bars 19 and 20 of the main assembly frame 18 of the commutator unit CU. The side arms 30 of the control bracket 29 are provided at their upper ends with spaced fingers 31, between each pair of which is mounted a circular grooved member 32 secured to each end of a rotatable control rod 33, which extends through an elongated slot 34 in each operating control slide 25a–d and weight value locating control slide 26 and is adapted normally by engaging one end of the slot 34 to hold the selector fingers in their inoperative positions, out of contact with the weight selector discs, so as to permit the discs to rotate freely with the indicator shaft while the weighing mechanism is in operation.

The control bracket 29 (Figure 3) is provided with a depending forked operating member 35, which is formed with spaced arms 35a secured to the bracket rod 29a. The spaced arms 35a have spacers 35b and carry at their lower ends a roller 36 adapted to engage a semi-circular cam 37, which is secured to a clutch operating shaft 38 having its inner end attached to a standard clutch 39 carrying a clutch member (not shown) and having its outer end journaled in an upright standard 40 mounted on the base plate 41. The outer end of a drive shaft 42, which extends through an annular clutch cover cap 39a, is keyed to the end of an intermediate shaft 42a carrying a co-operating clutch member (not shown) which shaft in turn is geared to the motor shaft of a reduction motor M in circuit with an electrical source E (Fig. 11), and adapted to run continuously during the weight value transmitting and recording operations. Thus by operation of the control bracket 29 the movement thereof is adapted to alternately lock and release all the selector slides at the proper time to permit them to set up the selected contactor arms 86 of the respective contactor assemblies CA—1 to 4. Pivotally mounted in a standard 43, which is attached to the base plate 41, is a clutch control arm 44 having its outer end provided with a depending detent 45, normally adapted to extend into a recess 46 in the periphery of the clutch housing 47. Further, by this means the clutch 39 and consequently control bracket 29 and the control slides 25a—25d and 26 are held locked in their normal positions as shown in Fig. 3. The inner end of the clutch control arm 44 is pivotally connected to the upper end of the core piece 48 of a solenoid S—1, which is in circuit with the source of electricity E and adapted when energized, as previously described, to raise the outer end of the clutch control arm 44, thus releasing the detent 45 from the clutch 39 and permitting the clutch to rotate with the shaft 38. Rotating with the shaft 38 and attached to its outer end by its hub 49a is a switch control disc 49, while a collar 49a is mounted on the end of the shaft 38. The disc 49 is provided with an elongated raised peripheral portion 50a and an adjacent elongated recessed portion 50b, the raised periphery 50a being adapted to rotate operatively in a contraclockwise direction, engaging and pressing in its operative cycle a roller 51, which rides on the raised periphery 50a and is carried by the lower arm 52 of a resilient switch control member 53 adapted to close and operate a sensitive electric switch SW—1, which is in circuit with the contactor assemblies CA—1 to 4 and the impulse units IU—1 to IU—4, while in the inoperative position of the disc 49 the roller 51 travels freely in the recessed peripheral portion 50b. Upon the actuation of the switch by the elongated raised peripheral portion 50a the switch is held closed for a sustained interval in order to permit the current to be transmitted to the contactor assemblies CA and impulse units IU and thereby render them both electrically operative after which the switch is held open for a sustained interval by the roller 51 passing into the elongated recessed portion 50b and stopping there while the disc 49 is locked in its inoperative position (Fig. 1). The resilient switch control member 53 comprises primarily a depending leaf spring 54 having the lower arm 52 attached thereto and its upper end secured to an upper arm 55 which is pivotally mounted on a stud 56 secured to a downwardly extending switch plate 57, upon which is mounted the sensitive electric switch SW—1, operated by a contact plunger 58.

After the electrifying of the contactor assemblies CA and further rotation of the shaft 38, the cam 37 is carried out of engagement with the roller 36 of the control slide bracket 29, thereby releasing the control rod 33, so that it is no longer effective in holding the operating control slides 25a—25d and locating control slide 26 in a locked position. The selector slides are thereby freed and the selector fingers 13a—13d are thus permitted to be advanced into engagement with the weight value selector discs 8—12, as set up by the weighing mechanism, under control of a series of retractile coiled springs 59, each of which is attached at one end to a depending arm 60, carried by its respective selector slide and secured at its other end to a laterally extending lug 61 on the end wall 18a of the main frame 18. A retarding arm 62 fixedly secured to the inner upright frame support 20a (Figs. 3 and 4), and engaging the inner surface of the switch control disc 49 serves to retard and control the rotation of the disc and the associated cam 37 carried on the same operating shaft 38, so that sufficient time in the cycle of operation of the raised peripheral portion 50a will be allowed to permit the operation of the various units, thereby enabling the selector slides and selector fingers to be properly positioned in the selector discs and the weight values thereby established to be electrically transmitted and recorded as hereinafter described.

When the recording operation has been completed the switch control disc 49 will have reached a position where the roller 51 of the switch control member 53 enters the recessed peripheral portion 50b, thereby opening the switch SW—1 and consequently the circuit to the contactor assemblies CA—1 to 4 and impulse units IU to IU—4. At this point the inner end of the clutch control arm 44 is raised together with the core piece 48 of the solenoid S—1 by means of a retractile coiled spring 63 attached to the clutch control arm 44 and a lateral stud 63a on the end wall 18a of the main frame 18, whereby the outer end of the arm is lowered carrying the clutch detent 45 into the clutch recess 46 and locking the clutch 39. Simultaneously the cam 37 engages the roller 36 carried by the control arm 35 of the selector slide control member 29 and swings the arm outwardly, carrying its control rod 33 into engagement with the outer ends of the slots 34 of the operating control slides 25a—d and 26, (Fig. 3), which results in withdrawing the selector fingers 13a—d and 14 carried by the selector slides from engagement with the selector discs 8, 9, 10, 11 and 12 (Figs. 1 and 2), and consequently locking the slides and fingers in their inoperative positions, which are thus held ready for subsequent operation.

*Electric impulse weight value transmitter*

For the purpose of transmitting the weight values registered by the weight selector discs 8—11 (Figs. 1, 2 and 6) a series of electrical contactor assemblies CA—1 to 4 are under control of the operating control slides 25a—25d (Fig. 3) and are grouped together and form an electrical transmitter or commutator unit CU (Figs 3 and 5), which is enclosed by a detachable housing H. Each contactor assembly CA is comprised of an insulating sector strip 64 having on one side a brass common unitary contact sector plate 65, while on the other side is a brass multiple contact sector plate 66, which is provided on its lower edge with a series of rectangular, radial recesses 67 forming a series of nine intervening, downwardly projecting impulse contact fingers 68, each one representing in sequence, right to left a unit from 0 to 9 (Fig. 3) of the particular numerical order the zero being normally set up by the associated type wheel T1—T4 and hence requiring no impulse contact. Further, each contactor assembly CA is separated from its adjoining assemblies by an insulating sector 69 of suitable insulating material, one of which is mounted on each side of the complete commutator unit CU. The various contactor assemblies CA are fixedly mounted together on insulating tubes 70 inserted in co-inciding transverse openings 71 in the contactor assemblies CA, in which tubes are inserted contactor assembly tie rods 72, which are secured in one unit by lock nuts 73, while spaced commutator rods 74 are inserted in similar insulating tubes 75 disposed in transverse openings 76 in the ends of all the contactor assemblies CA of the commutator unit CU. The commutator rods 74 are mounted in openings 77 in the spaced upper arched sections 78 of the commutator frame CF, which is mounted on the cross bars 21 and 22 of the main frame 18 below, while locking collars 79 secured by set screws are mounted on the commutator tie rods 74 at each side of the commutator unit CU, and serve to fixedly hold the unit in its proper position on each commutator tie rod 74. Similar locking collars 80 likewise secured by set screws are mounted on the commutator tie rods 74 adjacent to the inner sides of the arched frame sections 78, and serve to fixedly hold the commutator unit in its proper position in the frame CF.

All the common contact sectors 65 are joined together in an opening 81 at the tip 82 of each contact sector lug 65a by a common lead wire 83 secured in each opening and in circuit with the source of electricity E (Fig. 11), while each impulse contact sector 66 is provided with an impulse sector lug 66a to which one of the lead wires 84a—84d is connected, and leading to a co-operating magnet of each impulse unit IU—1 to IU—4 in the recorder R, as is fully shown in the circuit diagram in Fig. 11.

The various impulse units control wires (Figs. 3, 7 and 11) including the auxiliary impulse unit lead wires 84a—84d and resetting unit control wires RU—a and RU—b, seven wires in number, are all assembled in one cable CB and by this means the number of wires carried by the cable to the recorder R is considerably reduced over the number of wires generally required in similar apparatus, which is a decided advantage in transmitting the current to a distant point, as well as in simplicity of construction resulting in a reduction in the cost of installation.

Located below the contactor assemblies CA—1 to 4 are a series of spaced and paired circuit closer contactor fingers 85a and b, one pair being secured to the upper end of each contactor arm 86 (Figs. 3 and 5), which arms are pivotally mounted on a transverse pinion rod 87, inserted in the lower side bars 88 of the commutator frame CF, which pinion rod 87 is held in position by locking collars 89. The contactor arms 86 are spaced apart by spacers 90 freely mounted on the pinion rod 87, and are held in position by fixed locking collars 91, while each contactor arm carries at its lower end a spur gear sector 92, which is disposed above its co-operating weight selector slide 25a—d and meshes with a toothed rack 93 carried on the upper edge of the co-operating weight selector slide, by the movement of which each contactor arm 86 is swung in an arc proportional in its amplitude to the movement of its co-operating weight selector slide under urge of the co-operating weight selector finger setting up the particular weight value registered by the associated weight selector disc. The circuit closer contactor fingers 85a and 85b have two spaced cup-shaped wiping contactor tips 94a and 94b, which contactor fingers are electrically connected but physically separated by an insulator 96 adapted to prevent the current from entering the other parts of the commutator unit. The fingers 85a and b are secured by rivets 86a and b to the fingers 86, the contactor tip 94a being adapted in its movement to engage and contact the common contactor sector 65 and the contactor tip 94b at the same time engaging the fingers 68 of the impulse contactor sector 66 (Figs. 3 and 5), shunting the current by means of the upper rivets 86b and thereby closing the circuit leading therefrom to and energizing an associated electrical magnet in the recorder R as hereinafter described.

In operation as each contactor arm is swung in its arc over the co-operating contactor assembly CA its common contactor tip 94a will engage the continuous common contactor sector 65, while its co-operating impulse contactor tip 94b will pass over and contact as many contactor fingers 68 of the impulse contactor sector 66 as there are units to be set up in the particular numerical order by the weight selector mechanism. One electric impulse is thus transmitted to the electrical magnet of the associated impulse unit IU of the recorder R each time in its travel the particular impulse contactor tip 94b contacts a contact finger 68 and thereby closes the circuit, each digit column are made, and the total weight value of the load is thus transmitted for recording to the recorder R.

*Electrical impulse recorder*

The recorder R is mounted on a base plate 97 of a cabinet RC, and is preferably placed at a convenient location at one side of the dial head 2 (Fig. 1), but if so desired, may be located at a more remote position. Secured to the base plate 97 by their upright supports 98 are spaced and aligned magnet frames 99, while within the spaced arms 100 of each frame is mounted one of a series of aligned electrical impulse units IU—1 to 4.

Each impulse unit IU is comprised of a magnet coil 101—4, a U-shaped core-member 105 formed of laminated soft iron plates, which is mounted on spaced pins 106 between the upper ends 108 of each pair of supports 98, together with an armature member 107 likewise formed of laminated soft iron plates secured by the elongated side arms 108, which are pivotally mounted on a pin 109 carried by the side arms and held in spaced, lateral upper arms 110 of the frame 99. The armature member 107 in operation is attracted and momentarily held by the associated core-member 105 when electrically energized, under influence of the current impulse, which is transmitted to the particular magnet 101—4 from the commutator unit CU under control of the particular operating control slide 25a—25d as previously described. In its inoperative position the armature member 107 is normally held in an elevated position (Fig. 10) under control of a retractile coiled spring 111 secured to a pin 112 in the side arms 108 and a pin 113 secured in the lower spaced, lateral arms 114 of the frame 99. A copper flapper plate 115 interposed between the impulse magnet coil 101—4 and the armature 107 of each impulse unit is flexibly mounted by its inner end 116 to the inner arm of the core-member 105, and is adapted to prevent the armature 107 from sticking to the core-member 105 during the energizing of the particular magnet coil 101—4 and thus permit a succession of impulses to be separately and uninterruptedly transmitted. Disposed opposite the aligned impulse units IU and spaced therefrom is an electrically operated universal resetting control unit RU, which is adapted to simultaneously reset all the recorder units of the recording mechanism upon completion of the recording operation, as will be hereinafter described.

Located between the aligned impulse units IU—1 to 4 and the reset unit RU is a series of longitudinally disposed and interfitting telescopic tubes T—1 to 4 (Figs. 7 and 8), which are journaled in and freely rotatable contra-clockwise in longitudinally disposed, spaced posts 117 secured to an elongated supporting frame 118. Each tube has mounted on its outer end a recording type wheel TW—1 to 4, which is rotatable with its particular tube, the type wheels representing respectively the units, tens, hundreds, and thousands digits, each wheel being provided on its periphery with a series of type numerals TN, 0 to 9. For the purpose of rotating each tube T—1 to 4 there is fixedly secured on its inner end a ratchet drum 119 which is provided with two spaced, annular ratchet sections 120 and 121 adapted respectively to rotate and lock the particular tube at each rotation thereof. The tube rotating ratchet section 120 of each of the units, tens, hundreds, and thousands impulse units IU is provided with a series of nine teeth, each one representing a digit from 1 to 9 of the number transmitted from the commutator unit CU to the associated impulse unit IU—1 to 4 (Figs. 7 and 10) and an elongated flat-faced tooth representing 0 (Fig. 10) while the tube locking ratchet section 121 is provided with ten teeth.

In order to actuate the tube rotating section 120 each magnet armature 107 carries on a shaft 107a located at the outer end of its side arms 108 a pivotally mounted depending actuating dog 122 (Figs. 7 and 10) held in a central position by spacers 122a. The hooked end 123 of the dog is resiliently held in contact with the teeth of the tube ratchet section 120 by means of a leaf spring 124 which is held in a bracket 125, while the downward movement of the dog is limited by a vertical stop post 126. Thus in operation the hooked end 123 of the dog 122 is adapted to engage one of the cooperating teeth of the tube ratchet section 120 and to turn the cooperating tube T—1 to 4 and one numeral TN of its type wheel TW—1 to 4 each time the associated armature 107, which is under control of its cooperating magnet coil 101—4 when energized by an electrical impulse, is attracted and the dog 122 consequently raised to engage and actuate one of the teeth.

At each turning of a particular tube T—1 to 4, a tooth of the tube locking ratchet section 121 is engaged by the toothed end 127 of a vertically disposed tube locking dog 128, which is in an opposed position to the actuating dog 122 pivotally mounted on a shaft 129 carried in the spaced arms 130 of a bracket 131 attached to the frame 118. The toothed end 127 is normally held in successive engagement with the teeth of the locking ratchet section 121 by a coiled spring 132 encircling the shaft 129 (Fig. 10), by which means the tube is securely held at each turn and the particular set up numeral of the cooperating type wheel TW—1 to 4 is thereby properly registered and aligned at the printing station P (Figs. 8 and 9).

The universal resetting control unit RU (Figs. 7 and 10) provides means for all releasing the tubes T—1 to 4 from their set up positions under control of the impulse units IU—1 to 4, as has been previously described. This unit is controlled by a manually operated electric switch RS (Fig. 7), and is comprised of a solenoid 133 mounted in a frame 134 located between the arms of a laminated U-shaped core-member 135 held in the frame by spaced pins 136, and having also a laminated armature 137 slidably mounted in the extended side arms 138 of the frame 134 and limited in its outward movement by transverse stop pins 139 carried by the side arms 138. The whole unit is attached to spaced angle plates 140, which are secured to a supporting frame 141 attached to the base plate 97. The resetting solenoid coil 133 (Fig. 10) is provided with an armature rod 142 inserted therein, which is secured by a pin 143 to the armature 137 and is adapted to slide freely in an opening 144 in the base of the core-member 135. A copper flapper plate 145 flexibly attached by its lower end to the inner side of the armature 137 is adapted to prevent the armature from sticking in its operation. The armature rod 142 is inserted in an expanded coiled spring 146, which is interposed between the solenoid coil 133 and the armature 137, which spring is adapted normally to urge the armature rod 142 forward to its advanced or inoperative position as shown in Figs. 7 and 10. The outer end of the armature rod 142 is also provided with a transversely disposed universal resetting control rod 147 fixedly secured therein by a set screw 148, which extends longitudinally in front of the entire series of impulse units IU—1 to 4.

The function of the universal resetting control rod 147 (Fig. 10) is to actuate mechanism adapted to reset the various tubes T—1 to 4 and type wheels TW—1 to 4 and return them to their zero or inoperative positions (Fig. 10). This is accomplished by the universal engagement and cooperation by the universal resetting control rod 147 with a pin 149 vertically mounted on the toothed end 127 of each resiliently held tube locking dog 128, when the solenoid coil 133 is energized by the manual operation of the resetting control electric switch RS at the completion of the recording operation. Then under control of the energized solenoid coil 133 the armature rod 142 is pulled inwardly, which movement carries the universal resetting control rod 147 along with it and causes the control rod to tip forward simultaneously all the tube locking dog pins 149, thereby releasing the toothed end 127 of all the tube locking dogs 128 from the engaged teeth of all the ratchet tube locking sections 121. Upon release of the locking dogs 128 each of the tubes T—1 to 4 is automatically turned back to its zero or inoperative position under control of a retractile coiled spring 150 having one end attached to the tube supporting frame 118 and the other end to a wire 151, passing over a groove 152 in a pulley 153, which is rotatably mounted between fixed spacers 153a disposed on a longitudinal, rotatable shaft 154 secured in the spaced, vertical arms 155a of a standard 155 mounted on the base plate 97 (Figs. 7 and 10). The other end of the wire 151 is secured by a set screw 156 to a drum 157 carrying a radially extending stop pin 158 and spaced from the ratchet drum 119, the drum 157 being fixedly secured to the inner end of each tube, the wire traveling in an annular groove 159 therein, while below each drum 157 is an L-shaped stop member 160, which serves by the engagement of the stop pin 158 therewith, to limit the turning movement of each tube and to hold it at its zero position.

It is to be noted that in transmitting the weight value of the load there are employed in succession a contactor assembly CA, an impulse unit IU, a tube T and a type wheel TW for each digit column to be set up at the printing station P.

*Printing mechanism*

The printing mechanism PM (Figs. 7, 8, and 9) is arranged to co-operate with the type wheels TW—1 to 4 at the end of the cabinet RC and includes an L-shaped printing hammer 161, which is pivotally mounted in spaced bosses 162 attached to the top 163 of the cabinet RC. At the end of the upper arm 164 of the printing hammer 161 is the hammer head 165, on which is an operating knob 166, while below is a platen 167 inserted in the hammer head, covered by a resilient buffer 168 and secured therein by a transverse pin 169. Below the platen 167 is an opening 170 provided with beveled edges 171 in the cabinet top 163, in which opening the type wheels TW—1 to 4 are set closely together and are adapted to be rotated to their set up position. Adjacent to the opening 170 and aligned therewith are disposed in spaced bosses 172 two rollers 173, over which and the intervening printing table section PT of the cabinet top, forming the printing station P, an inked ribbon 174 is adapted to travel. The ribbon 174 is carried by opposed spools 175 and 176 passing through opposed openings 174a and b in the printing table PT, which spools are mounted on spindles 177 carried by upright standards 178 and 179, each spindle being provided on its inner end with an expanded coiled spring 180 adapted to hold the hub 181 of the spindle in yielding engagement with a boss 182 on each standard. The depending lower arm 183 of the printing hammer 161 has its lower end pivotally attached to one end of a coiled spring 184, the other end of which is attached to the standard 178. Pivotally mounted on the lower arm 183 is a link 185, which is pivotally connected to a ratchet arm 186, pivotally mounted on the spindle 177 of the spool 175 and carrying a spring actuated pawl 187 adapted to engage a ratchet wheel 188, which is secured to the spindle 177 and under control of the printing hammer lower arm 183 so as to be actuated on each backward stroke of the arm 183 to turn the ratchet wheel 188 and the spool 175 and thus feed forward the ribbon from spool 176 to the spool 175.

In printing a record of the weight value of the load as set up by the type wheels TW—1 to 4, the imprint is made by the platen 167, under control of the manually operated knob 166, being pressed thereby on a ticket TK or sheet of paper inserted at the printing station P between the platen 167 and the inked ribbon 174 above the type wheels TW—1 to 4.

*Cycle of operation of the recorder operating units*

After the weight of the load has been established and the weight value set up on the weight value selector unit SU (Figs. 1 and 2), the operation of the various units of the recorder is initiated by the successive manual operation of the electric line switch LS and the operating switch OS in circuit with the electrical source E, which momentarily energizes the solenoid S—1 (Figs. 3 and 4). Then under control of the core-member 48 of the energized solenoid S—1 the clutch control arm 44 attached thereto is raised, thereby releasing the rotatable clutch 39, which carries the control disc 49 and is operated by the continuously operating motor M.

As the disc 49 starts to rotate in a contraclockwise direction the roller 51 carried by the switch control member 53 rides up on the raised peripheral portion 50a, thereby causing the switch control member 53 to actuate the switch SW—1, which is in circuit with the series of electrical contactor assemblies CA—1 to 4 and the magnet coils 101—4 of the impulse units IU—1 to 4, thereby transmitting the current directly to both the contactor assemblies CA and the impulse units IU and rendering them electrically operative.

When the clutch rotates a little farther it moves the attached cam 37 free from engagement with the roller 36, carried by the pivoted selector slide control bracket 29 and normally locking the operating control slides 25a—25d and locating control slide 26, thereby freeing the bracket 29 and releasing it from the locked control slides. Thus under urge of the coiled springs 59 the operating control slides are permitted to move forward, carrying the weight selector fingers 13a—13d and locating finger 14 attached thereto into operative engagement with the previously set up weight value selector discs 8—11 and locating disc 12 of the selector unit SU. As the selector slides move forward the contactor arms 86 of the commutator transmitting unit CU, under control of the rack 93 carried by each operating control slide 25a—25d, are moved in an arc proportionately to the movement of the slides and in their travel the contactor arms 86 engage continuously the common contactor 65 and successively the number of impulse contactor fingers 68 of each contactor assembly CA, as set up by the weight value selector fingers 13a—13d, to designate the required digits for each contactor finger 68 of the co-operating contactor assembly CA in order to close the circuit therefrom and to thus transmit an electrical impulse through the cable CB to the associated impulse units IU—1 to 4. Thus each time an electrical impulse is received by one of the magnet coils 101—4 of an impulse unit IU it moves one tooth of the ratchet drum 119 and rotates the co-operating tube T and attached type wheel TW to set up one type numeral thereon at the printing station P. Accordingly, for example, if five impulses are transmitted to a particular magnet coil 101—4, the coil is energized five times, which causes five teeth of the ratchet drum 119 to be moved and thereby set up the numeral 5 on the type wheel TW. When the total weight value of the load has thus been set up on the type wheels a ticket TK is inserted at the printing station P and the knob of the printing hammer is manually operated and a printed record is made on the ticket.

When the printed record has been made the recording mechanism and type wheels TW are cleared and reset by operating the resetting switch RS, which energizes the universal resetting control unit RU, causing the resetting control rod 147 to simultaneously release the locking dogs 128 from the various ratchet drums 119 and thereby free the associated tubes T and type wheels TW and permit them to be returned to their zero positions under the urge of the cooperating retractile coiled springs 150, when the recorder is ready for further operation.

While I have shown a preferred embodiment of my invention it is evident that changes and modifications in the construction herein shown and described may be made that would come within the scope thereof and it is not intended, therefore, to limit the invention to the precise details of construction shown.

I claim:

1. In an impulse mechanism of the character described for use with an impulse recorder, reciprocable slide bars, means providing stops adapted for limiting forward movement of said bars, each to an extent corresponding to a digit to be recorded, springs urging said bars toward said stops, cam-actuated means adapted for holding said bars in an initial, inoperative position, and operable to release said bars simultaneously, for independent forward movement toward said stops under the influence of said springs, and to move said bars backwardly, to said initial position, electrical means operated by each of said bars during movement thereof, and adapted for producing a number of electrical impulses corresponding to the extent of individual bar movement as determined by the stop, and a control device common to said electrical means, arranged to be operated in timed relation with operation of said cam-actuated means, said control device being adapted to render said electrical means operative to produce impulses during the forward movement of said bars and inoperative to produce electrical impulses during the backward movement of said bars.

2. In an electric impulse transmitting device of the character described, for use in combination with an impulse recorder, a plurality of independently movable slide bars, means providing a stop for each of said bars adapted to limit movement thereof in one direction, each to a predetermined extent corresponding to a value to be recorded, springs for moving said bars toward said stops, means for holding said bars in an initial, inoperative position spaced from said stops, for releasing said bars for movement under the influence of said springs, and for returning the bars to their initial position following movement as aforesaid, said means including a member extending transversely of and adapted releasingly to engage said bars, and camming means operatively connected to said member and adapted to reciprocate the same in the direction of bar movement; a plurality of branch circuits, an interrupter device in each of said circuits, each of said devices being operatively connected to one of said slide bars and being adapted to produce impulses in number corresponding to the extent of bar movement, said contact devices each including a pivoted contact arm, interengaging teeth on said contact arm and slide bar for rocking said arm, and a series of spaced contact terminals adapted for successive engagement by said contact arm, a supply circuit common to said branch circuits, a control switch in said supply circuit, connected for operation by said camming means, said switch being adapted to close said supply circuit prior to, and to open said supply circuit following movement of said guide bars toward said stops.

3. In a device of the character described, a reciprocable slide bar, means providing a stop adapted for limiting movement of said bar in one direction to an extent corresponding to a digit to be recorded, a spring urging said bar toward said stop, an electric circuit, an interrupter in said circuit including a series or spaced contacts and a reciprocable contact arm movable along said series, intermittently to close said circuit in the production of electrical impulses therein, means connecting said contact arm for movement by said slide bar, whereby said interrupter is adapted to produce impulses in number corresponding to the extent of bar movement as determined by said stop, a lever engaging said bar and adapted for holding the bar in an initial, inoperative position, said lever being operable to release the bar for movement toward said stop, under the influence of said spring, and to restore the bar to said initial position, a motor, a cam-shaft driven from said motor, camming means on said shaft, operable to actuate said lever, and a control switch in series circuit relation with said interrupter operable by said camming means, said camming means being adapted to maintain the control switch in closed condition during movement of said bar toward its stop, and to maintain the control switch in open condition during the restoration of said bar to its initial position.

4. In a device for transmitting digits to be recorded, a reciprocable slide bar, an adjustably positioned stop adapted to limit movement of said slide bar theretoward to an extent commensurate with a digit to be recorded, a spring for moving said bar toward said stop, control means for said bar operable to hold said bar in an initial, inoperative position in spaced relation to said stop, to permit movement of said bar toward said stop under action of said spring, and to return said bar to its said initial position; an electric impulse transmitting circuit, an interrupter therein including a series of spaced contacts and a contact arm coacting therewith and operatively connected to the slide bar for reciprocal movement and successive engagement with said contacts, said interrupter being adapted to produce impulses in said circuit in a number corresponding to the extent of bar movement, and a switch operable in timed relation to said control means for conditioning the circuit for impulse transmission during movement of said contact arm only in one direction.

5. In a recording device of the character described, a gang of parallel, independently movable slide bars, means providing a plurality of adjustable stops adapted to be selectively positioned to limit movement of said bars to an extent commensurate to numbers to be recorded, springs for moving said bars toward said stops, longitudinal slots formed in said bars, a control rod common to said bars and extending transversely through said slots, cam mechanism for effecting lateral reciprocation of said control rod to permit movement of the bars toward said stops under the action of said springs and to restore said bars to an initial, inoperative position in spaced relation to said stops, a plurality of branch circuits each identified with one of said bars, an interrupting device in each circuit, operatively connected to the bar identified therewith, said interrupting device being adapted to produce electrical impulses which, in number, correspond to the extent of movement of its related bar, a supply circuit common to said branch circuits, a switch in said supply circuit, and means connecting said switch for operation by said cam mechanism to close said supply circuit prior to, and to open said supply circuit following movement of said guide bars toward said stops.

HARLAN A. HADLEY.